(12) United States Patent
Salg

(10) Patent No.: US 6,275,762 B1
(45) Date of Patent: Aug. 14, 2001

(54) DRIVE CONTROL FOR ENGAGEMENT AND DISENGAGEMENT OF AXLES OF A VEHICLE

(75) Inventor: Ditmar Salg, Salzweg (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/297,412

(22) PCT Filed: Nov. 11, 1997

(86) PCT No.: PCT/EP97/06271

§ 371 Date: Apr. 28, 1999

§ 102(e) Date: Apr. 28, 1999

(87) PCT Pub. No.: WO98/22302

PCT Pub. Date: May 28, 1998

(30) Foreign Application Priority Data

Nov. 16, 1996 (DE) .............................................. 196 47 507

(51) Int. Cl.[7] ....................................................... G06F 7/00

(52) U.S. Cl. .............................. 701/69; 701/84; 701/90; 180/247; 180/249

(58) Field of Search ................................ 701/69, 78, 83, 701/84, 90, 72; 180/233, 247, 248, 249, 197; 475/221, 206, 254, 86, 249, 150

(56) References Cited

U.S. PATENT DOCUMENTS

| 4,681,185 | * | 7/1987 | Hoernig et al. ................... 180/247 |
| 4,830,136 | | 5/1989 | Sommer ............................. 180/233 |
| 4,912,639 | | 3/1990 | Kawamoto et al. ............... 180/248 |
| 5,130,928 | * | 7/1992 | Petersen ............................. 701/78 |
| 5,301,769 | * | 4/1994 | Weiss ................................ 180/249 |
| 5,415,598 | * | 5/1995 | Sawase et al. ..................... 475/86 |
| 5,570,755 | * | 11/1996 | Fruhwirth et al. ................ 180/249 |
| 5,799,748 | * | 9/1998 | Origuchi ........................... 180/233 |

FOREIGN PATENT DOCUMENTS

| 34 27 725 A1 | 8/1985 | (DE) . |
| 35 05 455 A1 | 8/1986 | (DE) . |
| 35 05 455 C3 | 8/1986 | (DE) . |
| 36 36 260 A1 | 5/1988 | (DE) . |
| 42 02 026 A1 | 7/1993 | (DE) . |
| 0 521 275 A1 | 1/1993 | (EP) . |

* cited by examiner

Primary Examiner—Jacques H. Louis-Jacques
(74) Attorney, Agent, or Firm—Davis & Bujold, P.L.L.C.

(57) ABSTRACT

The invention concerns a drive control for motor and utility vehicles. The speeds of the wheels and the steering angle are measured by means of sensors. Driving axle slip is determined by comparing the average peripheral wheel speeds of the driven and non driven axles and by taking into account the steering geometry. Driving force and finally chassis efficiency are determined by the slip with the assistance of standard characteristic lines. The efficiencies of all-wheel drive and rear-wheel drive are compared. The drive with the higher degree of efficiency is engaged.

26 Claims, 1 Drawing Sheet

DRIVE CONTROL FOR ENGAGEMENT AND DISENGAGEMENT OF AXLES OF A VEHICLE

BACKGROUND OF THE INVENTION

The invention concerns a drive control for motor vehicles, in particular for land and forest utility vehicles. Said drive control produces the engagement or disengagement of additional driving axles together with the permanently driven axles. Vehicles in which additional driving axles can be engaged are known already, especially in the field of passenger cars and commercial vehicles. German OS 35 05 455 shows a drive control for automatic engagement and disengagement of driving axles. In addition to other criteria, the momentarily occurring slip is the main criterion for engaging and disengaging the all-wheel drive. If the slip of the driven axle exceeds a limit value, the all-wheel drive is engaged. If the slip falls below a limit value, the all-wheel drive is again disengaged. The cited publication describes, with a series of different control factors, a complicated drive control. But it is a disadvantage in this drive control that the slip limit values, even though depending on operating states such as the vehicle speed, are voluntarily determined. A slip whose occurrence is preventable is always associated with increased wear and fuel consumption. Especially in agricultural utility vehicles a slip of the wheels is to be prevented as far as possible, since thereby the arable soil or the grass stigma becomes damaged. This results in a reduction of produce. To protect the soil and keep the damage thereof as small as possible, the power dissipated in the soil must be minimized, that is, the efficiency of the driving train must be maximized.

SUMMARY OF THE INVENTION

The problem to be solved by the invention is to provide a drive control which by the engagement and disengagement of additional driving axles minimizes the loss of power in the power train caused by the slip, that is, maximizes the efficiency of the chassis.

DESCRIPTION OF THE PREFERRED EMBODIMENTS

Figure 1:
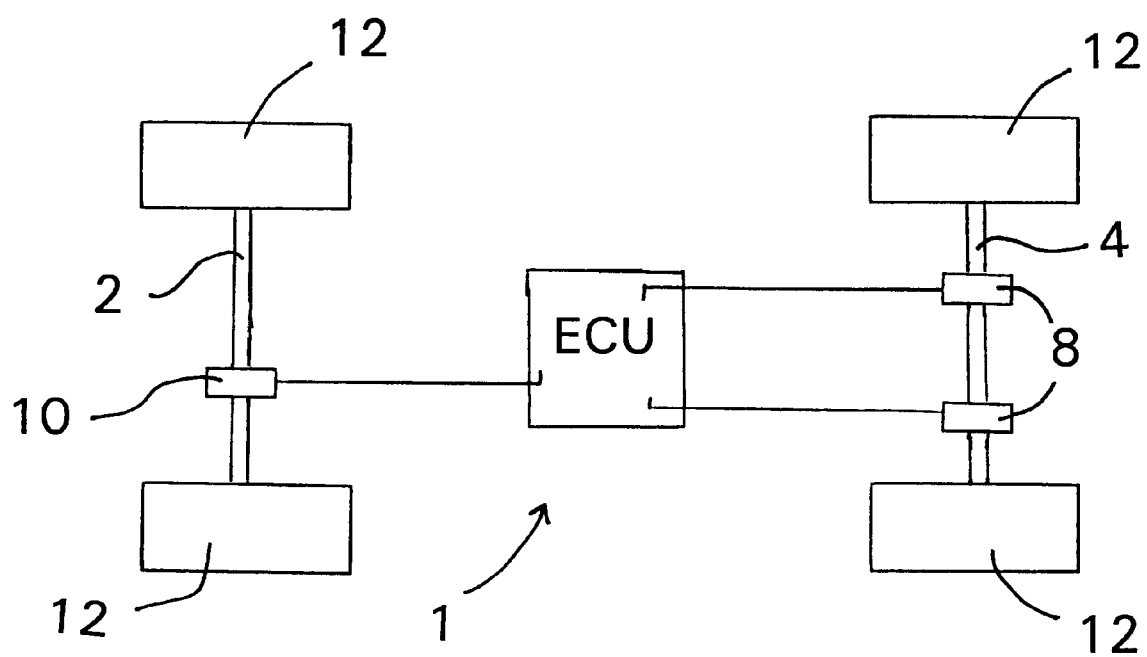
FIG. 1 is a schematic of the drive control and associated vehicle chassis structure.

The drive control 1 determines in motor or utility vehicles having at least one driven axle 2 and at least one other engageable driving axle 4 whether the latter is engaged or disengaged from the power train or remains there. For this purpose the chassis efficiencies are calculated with and without engaged driving axle or driving axles and compared with each other. If the chassis efficiency with engaged driving axle or engaged driving axles is higher than without engaged driving axles, the latter are engaged otherwise not. The chassis efficiency is defined by the quotient of driving power to total power. From said statement, under certain conditions and simplifications, mathematical formulae are drawn up according to a physical model by means of which the numerical value of the chassis efficiency is calculated. In the calculated formulae for the chassis efficiency enter parameters such as forces of gravity upon the axles, the coefficients of driving force and rolling friction, the wheel peripheral speeds, the ratio of the path speeds of the individual wheels determined by cornering, which among other things depends on the steering angle, and the wheel slip. The chassis command at least two speed sensors 8 on a steered axle and at least one speed sensor 10 on a driven axle 2. The steering angle can be calculated from the wheel speed ratios of the steered angle with no power engaged. Alternatively, the steering angle can be determined via a steering angle sensor. Both methods can be applied optionally or in combination. From the steering angle is determined the theoretical ratio of the wheel peripheral speeds without slip of the individual axles relative to each other. The slip on the driven axle(s) results then from the comparison of the theoretical ratio of the wheel peripheral speed with the actual peripheral speeds of the wheel 12 of the driven and non driven axles determined by the speed sensors. When speaking herebelow of the speed of the wheels of an axle, what is meant, when mentioning only one speed per axle, is always the average speed of the wheels of said axle. For certain standard background conditions, the functional relationships of the coefficients of driving force and rolling friction of the slip can be deposited in characteristic lines in an electronic control unit. With the aid of said characteristic lines these coefficients can be determined from the slip values found in the above manner. From said coefficients, the steering angle, the preset or measured axle load distribution and the slip, the chassis efficiency is calculated in the permanently driven axle(s). By one other mathematical equation and other characteristic lines, the chassis efficiency when driving is calculated, on one hand, by said permanently driven axle or permanently driven axles and, on the other, by one or more added engaged driving axles. For the case that all axles of the motor vehicle are driven, the slip cannot be determined in the above manner by comparison of the theoretical ratio of the wheel peripheral speeds with the actual peripheral speeds of the wheels of the driven and non driven axles, since in this case there are no non driven axles by which the actual vehicle speed can be determined. The slip to be expected in all-wheel drive must therefore be determined in a different way. The condition that the traction of the motor or utility vehicle must be equal when driving by the permanently driven axle or axles and when all-wheel driving establishes the total slip value and the coefficients of driving force and rolling friction that enter into the calculation of the efficiency of the chassis. The relationship between slip in all-wheel drive and coefficients of driving force and rolling friction in all-wheel drive is here again deposited in the characteristic lines. As already mentioned above, the ratio of the calculated chassis efficiency is used as engagement criterion for the additional driving axle(s) wherein for positive slip in a quotient of the chassis efficiency, on one hand, with engaged driving axle(s) and on the other without engaged driving axles of more than 1, the engagement criterion is fulfilled. For negative slip, that is push slip, the engagement criterion is a quotient of the chassis efficiency, on one hand, with engaged driving axle(s) and, on the other, without engaged driving axles of less than 1. This calculation contains a certain magnitude of error insofar as the soil property expressed in the characteristic lines for coefficients of driving force and rolling friction is assumed to be standard soil property and does not correspond to the actual. But from this analysis of the numerical data in the test it is demonstrated that the quotient of the chassis efficiency to great extent is independent of the soil property.

In an advantageous development of the invention the rear axle is permanently driven and the front axle can be engaged as driving axle. The quotient of the chassis efficiency of all-wheel and rear-wheel drive $$\frac{\eta_A}{\eta_H}$$

is used as engagement criterion of the all-wheel drive wherein the rear wheel slip $$i_H \geq 0$$

$$\frac{\eta_A}{\eta_H} \geq 0$$

applies and for the rear wheel slip $$i_H \leq 0$$

$$\frac{\eta_A}{\eta_H} < 0$$

applies.

The chassis efficiency $n_H$ for the rear-wheel drive is given by the quotients from the wheel traction power $P_T$ of the total chassis and the wheel hub power $P_{N\_H}$ of the driven rear axle, $$\eta_H = \frac{P_T}{P_{N\_H}}$$

wherein the wheel traction power $P_T$ is composed of the wheel traction power $P_{T\_H}$ of the rear axle and the rolling friction loss power $P_{R\_V}$ of the front axle:

$$\eta_H = \frac{P_{T\_H} - P_{R\_V}}{P_{N\_H}}$$

The wheel traction power $P_{T\_H}$ of the rear axle is the product from the wheel traction $F_{T\_H}$ of the rear axle and the speed $V_H$ of the rear axle over ground. The rolling friction power loss $P_{R\_V}$ of the front axle is the product from the rolling friction force $F_{R\_V}$ of the front axle and the speed $v_V$ of the front axle over ground. As result of the different road lengths which the front axle and the rear axle cover when cornering, said speed $v_V$ is different from the speed $v_H$ of the rear axle. The hub power $P_{N\_H}$ of the driven rear axle is the product from the wheel peripheral force $F_{U\_H}$ and wheel peripheral speed $v_{O\_H}$ of the rear axle. The wheel peripheral speed $v_{O\_H}$ is defined by the product from the angular speed of the wheel and radius of the wheel. Thus results for the chassis efficiency $\eta_H$ for rear wheel drive:

$$\eta_H = \frac{F_{T\_H} v_H - F_{R\_V} v_v}{F_{U\_H} v_{O\_H}}$$

The wheel traction $F_{T\_H}$ of the rear axle is associated as proportionality factor via the coefficient of driving force or positive engagement $\kappa_{h\_H}$ in rear wheel drive with the rear axle portion of weight $F_{Gh}$ of the vehicle. The rolling friction force $F_{R\_V}$ of the front axle over the rolling friction coefficient $\rho_v$ of the front axle in rear-wheel drive is analogously proportional to the front axle portion of the weight force $F_{Gv}$ of the vehicle. The wheel peripheral force $F_{U\_H}$ is the product of the sum of driving force coefficient $\kappa_{h\_H}$ in rear-wheel drive and rolling friction coefficient $\rho_{h\_H}$ of the rear axle in rear-wheel drive and the rear axle portion of the weight $F_{Gh}$ of the vehicle. Thus the chassis efficiency $\eta_H$ for rear-wheel drive can be expressed as follows:

$$\eta_H = \frac{\kappa_{h\_H} F_{Gh} v_H - \rho_v F_{Gv} v_V}{(\kappa_{h\_H} + \rho_{h\_H}) F_{Gh} v_{O\_H}}$$

If the wheel peripheral speed $v_{O\_H}$ of the rear axle is higher than the speed $v_H$ of the rear axle over ground, then the wheel slip is a pull slip or a positive slip. The average slip $i_H$ of the rear wheels of the vehicle in rear-wheel drive is then defined as follows:

$$i_H = 1 - \frac{v_H}{v_{O\_H}}$$

With this definition the speed $v_H$ of the rear axle over ground can be expressed by the average slip $i_H$ of the rear wheels and the wheel peripheral speed $v_{O\_H}$ of the rear axle as follows:

$$v_H = (1 - i_H) v_{O\_H}$$

The speed $v_V$—as already mentioned above—differs from the speed $v_H$ of the rear axle as result of the different road lengths which the wheels of the front axle and those of the rear axle cover when cornering. If the parameter s is introduced as the ratio of the average path speeds of the front wheels and rear wheels, the speed $v_V$ can be expressed by the speed $v_H$ of the rear axle $$v_V = s v_H$$

and via the above equation by the slip $i_H$ of the rear wheels and the wheel peripheral speed $v_{O\_H}$ of the rear axle can be written $$v_V = S(1 - i_H) v_{O\_H}$$

With the aid of these equations the following formula results for the chassis efficiency in rear-wheel drive for positive slip $$\eta_H = \frac{\kappa_{h\_H} - s\rho_v \frac{F_{Gv}}{F_{Gh}}}{\kappa_{h\_H} + \rho_{h\_H}} * (1 - i_H)$$

The mathematical equation for the chassis efficiency is all-wheel drive for positive slip is derived in analogous manner.

The chassis efficiency $\eta_A$ for all-wheel drive is given by the quotients from the wheel traction force $P_T$ of the whole chassis and the wheel hub power $P_{N\_A}$ of the driven axle $$\eta_H = \frac{P_T}{P_{N\_A}}$$

wherein the wheel traction power $P_T$ is here composed in case of the all-wheel drive from the wheel traction power $P_{T\_H}$ of the rear axle and the wheel traction power $P_{T\_V}$ of the front axle:

$$\eta_H = \frac{P_{T\_H} + P_{T\_V}}{P_{N\_A}}$$

The wheel traction power $P_{T\_H}$ of the rear axle is the product from the wheel traction force $F_{T\_H}$ of the rear axle and the speed $v_H$ of the rear axle over ground. The wheel traction power $P_{T\_V}$ of the front axle is analogously the product from the wheel traction force $F_{T\_V}$ of the front axle and the speed $v_V$ of the front axle over ground. Said speed $v_V$ is—like in the rear-wheel drive—different from the speed $v_H$ of the rear axle as result of the different road lengths which the wheels of the front axle and those of the rear axle cover when cornering. The wheel hub power $P_{N\_A}$ of the driven rear and front axles is the sum of the product from wheel peripheral force $F_{U\_H}$ and wheel peripheral speed $v_{O\_H}$ of the rear axle and of the product from wheel peripheral fore $F_{U\_V}$ and wheel peripheral speed $v_{O\_V}$ of the front axle. Wheel peripheral speeds $V_{O\_H}$ and $v_{O\_V}$ are respectively defined by the product from angular speed of the wheel and radius of the wheel.

Thus results for the chassis efficiency ηA for all wheel drive $$\eta_H = \frac{F_{T\_H}v_H + F_{T\_V}v_V}{F_{U\_H}v_{O\_H} + F_{U\_V}v_{O\_V}}$$

The wheel traction force $F_{T\_H}$ of the rear axle, via the driving force or positive engagement coefficient $\kappa_{h\_A}$ of the rear axle in all-wheel drive, is associated as proportionality factor with the rear wheel portion of the weight $F_{Gh}$ of the vehicle. Similarly the wheel traction force $F_{T\_V}$ of the front axle, via driving force or positive engagement coefficient $\kappa_{V\_A}$ of the front axle in all-wheel drive, is associated as proportionality factor with the front axle portion of the weight $F_{GV}$ of the vehicle. The wheel peripheral force $F_{U\_H}$ of the rear axle is the product from the sum of driving force coefficient $\kappa_{h\_A}$ of the rear axle in all-wheel drive and rolling friction coefficient $\rho_{h\_A}$ of the rear axle in all-wheel drive and the rear axle portion of the weight $F_{Gh}$ of the vehicle. Similarly to this the wheel peripheral force $F_{U\_V}$ of the front axle is the product from the sum of driving force coefficient $\kappa_{v\_A}$ of the front axle in all-wheel drive and rolling friction coefficient $\rho_{v\_A}$ of the front axle in all-wheel drive and the front axle portion of the weight $F_{Gv}$ of the vehicle. Thus, the chassis efficiency $\eta_A$ for all-wheel drive can be expressed as follows:

$$\eta_A = \frac{\kappa_{h\_A}F_{Gh}v_H + \kappa_{v\_A}F_{Gv}v_V}{(\kappa_{h-A} + \rho_{h\_A})F_{Gh}v_{O\_H} + (\kappa_{v-A} + \rho_{v\_A})F_{Gv}v_{O\_V}}$$

If the wheel peripheral speeds $v_{O\_H}$ and $v_{O\_v}$ of the rear and front axles are higher than the speeds $v_H$ and $v_V$ of the rear axle over ground, then the wheel slip is a pull slip or positive slip. The average slip $i_A$ of the rear wheels of the vehicle in all-wheel drive is then defined as follows:

$$i_A = 1 - \frac{v_H}{v_{O\_H}}$$

With this definition the speed $v_H$ of the rear axle over ground can be expressed by the average slip $i_A$ of the rear wheels in all-wheel drive and the wheel peripheral speed $v_{O\_H}$ of the rear axle as follows:

$$v_H = (1-i_A)v_{O\_H}$$

The speed $v_V$—as already mentioned above—is different from the speed $v_H$ of the rear axle as result of the different road lengths which the wheels of the front axle and those of the rear axle cover in cornering. If the parameter s is introduced as ratio of the average path speeds of the front wheels and rear wheels, then the speed $v_V$ can be expressed by the speed $v_H$ of the rear axle:

$$v_V = sv_H$$

By the above equation the speed $v_V$ of the front axle over ground through the slip $i_A$ of the rear wheels in all-wheel drive and the wheel peripheral speed $V_{O\_H}$ of the rear axle can be written as follows:

$$v_V = s(1-i_A)v_{O\_H}$$

The wheels of the rear and front axles do not necessarily have to be driven at the same speed. Specially when cornering it is convenient to drive the wheels of the front axle quicker than those of the rear axle, since they have to corner a wider path. This means that the ratio e of the average driving speeds of the front wheels and rear wheels do not always necessarily have to equal 1. The wheel peripheral speed $v_{O\_V}$ of the front axle can thus be expressed by the wheel peripheral speed $v_{O\_H}$ of the rear axle:

$$v_{O\_V} = ev_{O\_H}$$

With the aid of these equations there results for the chassis efficiency in all-wheel drive for positive slip the following formula:

$$\eta_A = \frac{\kappa_{h\_A} + s\kappa_{v\_A}\frac{F_{Gv}}{F_{Gh}}}{\kappa_{h\_A} + \rho_{h\_A} + e(\kappa_{h\_A} + \rho_{h\_A})\frac{F_{Gv}}{F_{Gh}}} * (1 - i_A)$$

If the wheel peripheral speeds $v_{O\_H}$ and $v_{O\_V}$ of the rear and front axles are lower than the speeds $v_H$ and $v_V$ of the rear axle over ground, then the wheel slip is a push slip or negative slip. The average slip $i_H$ of the rear wheels of the vehicle in the rear-wheel drive is in this case defined as follows:

$$i_H = \frac{v_{O\_H}}{v_H} - 1$$

According to this definition there similarly applies to the average slip $i_A$ of the rear wheels of the vehicle in all-wheel drive:

$$i_A = \frac{v_{O\_H}}{v_H} - 1$$

For negative slip the above equation for the chassis efficiency in rear-wheel drive thus change as follows:

$$\eta_H = \frac{\kappa_{h\_H} + s\rho_v\frac{F_{Gv}}{F_{Gh}}}{\kappa_{h\_H} + \rho_{h\_H}} * \frac{1}{1 + i_H}$$

For the chassis efficiency in all-wheel drive to the negative slip applies the equation:

$$\eta_A = \frac{\kappa_{h\_A} + s\kappa_{v\_A}\frac{F_{Gv}}{F_{Gh}}}{\kappa_{h\_A} + \rho_{h\_A} + e(\kappa_{h\_A} + \rho_{h\_A})\frac{F_{Gv}}{F_{Gh}}} * \frac{1}{1 + i_A}$$

As already mentioned above, the symbols designate:
$\eta_H$ chassis efficiency in rear-wheel drive $\eta_A$ chassis efficiency in all-wheel drive
$K_{h\_H}$ coefficient of driving force in rear-wheel drive
$K_{h\_A}$ coefficient of driving force or rear axle in all-wheel drive
$K_{v\_A}$ coefficient of driving force of front axle in all-wheel drive
S ratio of the average path speeds of the front wheels and rear wheels
$\rho_v$ coefficient of rolling friction of the front axle in rear-wheel drive
$\rho_{h\_H}$ coefficient of rolling friction of the rear axle in rear-wheel drive
$\rho_{h\_A}$ coefficient of rolling friction of the rear axle in all-wheel drive
$F_{Gv}$ front axle portion of the weight on the vehicle
$F_{Gh}$ rear axle portion of the weight of the vehicle
$i_H$ average slip of the rear wheels of the vehicle in rear-wheel drive
$i_A$ average slip of the rear wheels of the vehicle in all-wheel drive
e ratio of the average driving speeds of the front wheels and rear wheels.

The ratio s of the average path speeds of the front wheels and rear wheels can be determined by the equation $$s = \frac{1}{\cos\langle\delta_v\rangle}$$

with ($\delta_v$) the average steering angle of the wheel of the front axle.

The average slip Of $i_H$ of the rear wheels which enters into the formula for the chassis efficiency $\eta_H$ is measured by comparing the theoretical ratio of the wheel peripheral speeds of front to rear axles, which ratio takes into consideration the steering angle, with the actual peripheral speed ratio of the wheels of the front to rear axles, which ratio is determined by the speed sensors. At the same time with the non driven front wheels is measured the speed of the front wheels over ground and by the steering angle is calculated the speed of the rear wheels over ground. In all-wheel drive it is not possible to determine the slip in the above manner by comparing the theoretical ratio of the wheel peripheral speeds with the actual peripheral speed ratio of the wheels of the rear axle and front axle, since in this case the front wheels do not move along undriven and thus cannot measure the speed over ground. The slip to be expected when the all-wheel drive is engaged must therefore be determined in a different way. The condition that the traction of the motor or utility vehicle must equal in rear-wheel drive and in all-wheel drive, establishes the slip value and the coefficients of driving force and rolling friction for all-wheel drive which enter into the calculation of the efficiency of the chassis in all-wheel drive. As already mentioned above, for certain standard background conditions, the functional relationships of the coefficients of driving force and rolling friction of the slip can be deposited in characteristic lines in an electronic control unit. This applies to rear-wheel and to all-wheel drives. By the mathematical equation $$K_{h\_A} + K_{v\_A}\frac{F_{Gv}}{F_{Gh}} = K_{h\_H} - s\rho_v\frac{F_{Gv}}{F_{Gh}}$$

corresponding to the requirement "equal traction in rear-wheel and in all-wheel drives" the slip value, the coefficients of driving force and rolling friction for all-wheel drive are determined. Since the functional relation of the coefficients of driving force and rolling friction are certainly preset in characteristic lines under assumption of standard conditions, the above equation has only a single variable, the slip value in all-wheel drive, and can be solved.

As engagement criterion of the all-wheel drive is used the quotient $$\frac{\eta_A}{\eta_H}$$

For the pull slip, that is, for positive slip, to $$i_H \geq 0$$

applies $$\frac{\eta_A}{\eta_H} \geq 1$$

and for push slip, that is, for negative slip, to $$i_H \leq 0$$

applies $$\frac{\eta_A}{\eta_H} < 1$$

The engagement criterion in the latter case serves to release the service brake.

As already stated above this calculation contains a certain error magnitude insofar as the soil property which expresses itself in the characteristic lines for coefficient of driving force and rolling friction, is assumed as standard soil property and does not correspond to the actual. But the analysis of the numeric data in the test shows that the quotient of the chassis efficiency is to a great extent independent of the soil property.

In an advantageous development of the invention, after one or more additional driving axles have been engaged after a definite period of time, said axle or axles are again disengaged from the drive train in order to check again whether the engagement criterion has also been fulfilled. After the disengagement it is possible, by means of the non driven axles whose wheels are only entrained, to determine again the speed over ground of these wheels. By the length ratios of the wheel trailing tracks dependent on the steering angle, the speed over ground of the driven wheels is thus calculated once more. The above described cycle for testing the engagement criterion is repeated.

The engagement criterion is preferably re-examined when the steering angle changes by defined minimum amount. If the steering angle changes, therewith changes the ratio of the track lengths of the wheels of the front and rear axles. Therewith changes also the slip of the individual wheels and thus the coefficients of driving force and rolling friction. Finally this leads to other chassis efficiencies. To make this clear in an example, a farm tractor with traction load moving straight ahead on a flat road will, in all-wheel drive, show a pull slip on all four wheels. If it is steered to cornering, then the front wheels must cover more mileage than the rear wheels. But when the wheels are driven at fixed ratio to each other, it is possible that the front wheels be driven slower than corresponds to their roll off speed on the curved track. Thus there appears on the front wheels a push slip which results in damage to the chassis efficiency, since the rear wheels must apply stronger driving force in order to overcome the resistance of the front wheels. If the front wheels on the contrary are not driven but only run along freely, the push slip is perhaps less as result of the rolling friction and so is the driving force of the rear wheels to be applied. Therefore, it is convenient to re-examine whether the chassis efficiency during all-wheel drive is till higher than it is during rear-wheel drive.

In an advantageous development of the invention, in the case of several driven axles or all-wheel drive, the average axle driving speeds can be shifted to different ratios to each other. In order again to make this clear in the above example: a farm tractor with all-wheel drive is steered to cornering. The front wheels must cover a larger distance than the rear wheels. The front and rear wheels are first driven to the steady ratio of the wheel peripheral speeds of 1:1. The front wheels are more slowly driven than corresponds to their roll off speed in the longer curved routes. Thus, a push slip appears on the front wheels which leads to impairment of the chassis efficiency. If on the contrary the front wheels are driven quicker than the rear wheels, their longer track length in cornering is taken into account. If the ratio of the wheel peripheral speeds of the front and rear wheels is higher than that of the path speeds, then the front wheels move again with positive slip.

The ratio of the average wheel peripheral dimension of the individual axles is advantageously determined once more by means of calibrations. The wheel periphery directly enters proportionally into determining the peripheral speed of the wheels by the wheel speed measurement. The wheel periphery depends on tire abrasion, air pressure in the tiers and load of the tires. The wheel peripheral speed, therefore, can be determined only within said limits. The speed over ground is determined by the non driven wheels assuming that the slip is zero, that is, the push slip caused by the rolling friction is disregarded. The speed of the vehicle or of the individual wheels, or the average speed of the wheels of an axle is then calculated taking into consideration the geometry and steering geometry of the vehicle. The slip is measured and therewith are determined the coefficients of driving force and rolling friction, and finally the chassis efficiency is ascertained—as described above—by comparison of the peripheral speeds of the driven and non driven axles. But what is important here is only ratio, not the absolute magnitude of the speeds. Thus, to determine the chassis efficiency, it also is only the ratio, not the absolute magnitude of the wheel peripheral dimensions, that must be known. Said ratio can be determined by means of the speed sensors for the case that no slip occurs on the driven, the same as non driven wheels, which are used for determining the chassis efficiency. Hence, an operating state must be detected where no slip occurs. The basic idea here is that when slip occurs, it will be temporarily variable. It is not to be expected that a constant slip value in the course of a certain period of time be maintained. This means that the speed ratio of the driven and non driven wheels will constantly vary when slipping. If on the other hand it is constant for a certain period of time, it can be assumed that no slip occurs. The ratio of the average wheel peripheral dimension in straight ahead motion is conveniently calibrated without actuation of the brakes. If under these conditions the value of said ratio over a pre-defined time interval does not change beyond the preset tolerances, that value is stored as new calibrated value. In another advantageous development of the invention, the ratio of the average wheel peripheral dimensions of the individual axles is determined by calibrations, the driver indicating the time interval in which the calibration conditions are fulfilled. Said conditions are, similarly as in the above process: only one axle is driven, the vehicle moves straight ahead and the brakes are not actuated. At the same time the slip of the wheels is again assumed to be zero. Within this time interval is determined the ratio of the average wheel peripheral dimensions from the mutual ratios of the speeds of the axles.

The average steering angle of steering axle determined from the steering angle sensors is preferably tested by the steering angle determined from the wheel speed ratio between left and right wheels of said axle. The steering angle determined by the wheel speed ratio between left and right wheels is generally the exact value. But again it is a condition here that no slip occurs in the steered wheels. The wheels conveniently must not be driven or braked.

The additional driving axles are preferably not engaged until the engagement criterion remains valid for a predefined minimum time, or the distance in time between two moments with valid engagement criterion is shorter than a preset minimum time interval. Otherwise in a limit range in which the chassis efficiency of the rear-wheel and all-wheel drives is almost equal, there would be continued shifting back and forth which would greatly impair the driving comfort.

The additional driving axles are advantageously engaged when the service brake is actuated. In this way it is prevented in a vehicle without center differential that only the non engaged driving axles or only the continuously driven driving axles block. The braking action of the axles is as a rule uniformly distributed.

The additional driving axles are preferably disengaged when a steering brake is actuated. This is convenient when the steering axle is driven, since otherwise the input acts against the brake.

In an advantageous development of the invention, the all-wheel drive is engaged only in a speed range below approximately 15 km/h, said range reaching up to approximately 17 km/h upon accelerations of the vehicle and up to approximately 13 km/h upon decelerations. Otherwise a sudden shift would have negative effects on the driving characteristic. This limitation of course should not apply in braking and engage the all-wheel drive.

What is claimed is:

1. A drive control for a power train of a motor vehicle having a constantly driven axle and an engageable axle, the drive control comprising:

an electronic control unit for receiving data from first and second speed sensors positioned on a steerable axle for determining a peripheral speed of a pair of wheels supported by the steerable axle and a third speed sensor positioned on the driven axle for measuring a peripheral speed of a pair of wheels supported by the driven axle, wherein the electronic control unit includes means for determining engagement and disengagement of the engageable axle and the means for determining including:

means for obtaining from the first, the second and the third speed sensors initial data comprising an actual peripheral speed of the wheels of both the driven axle and the engageable axle;

means for determining a steering angle from one of a peripheral wheel speed ratio of each of the wheels of the steered axle and a steering angle sensor;

means for calculating from the steering angle a theoretical ratio of a relative peripheral speed of the wheels without slip for the driven axle and the engageable axle;

means for comparing the actual peripheral speed of the wheels of the driven axle and the engageable axle obtained from the first, the second and the third speed sensors with the theoretical ratio of the peripheral wheel speeds to determine slip of the driven axle;

means for generating, in the electronic control unit, initial characteristic lines from the determined slip to obtain a coefficient of driving force and a coefficient of rolling friction;

means for calculating a theoretical chassis efficiency of the driven axle via a first mathematical equation corresponding to a physical model using the coefficient of driving force, the coefficient of rolling friction, the steering angle, the slip and one of a preset axle load distribution and a measured axle load distribution;

means for obtaining further data via the first sensor, the second sensor and the third sensor from the driven axle and the engageable axle;

means for generating further characteristic lines to determine an actual slip value and an actual coefficient of driving force and an actual coefficient of rolling friction based upon a condition where a drive traction of the driven axle is equal to a drive traction of at least one additional driving axle;

means for calculating an actual chassis efficiency via a second mathematical equation and the further characteristic lines;

means for obtaining a ratio of the calculated chassis efficiency and the theoretical chassis efficiency, to be used by the electronic control unit as engagement criterion for determining engagement of the engageable axle; and means for engaging the second engageable axle when the engagement criterion is greater than 1 and in the event of positive slip, and, disengaging the engageable axle when the engagement criterion is less than 1 and in the event of negative slip.

2. The drive control according to claim 1, wherein a rear axle is the driven axle and a front axle is the engageable axle and, in the event of positive slip where only the rear axle is driven, means for applying the following mathematical equation for chassis efficiency:

$$\eta_H = \frac{\kappa_{h\_H} - s\rho_v \frac{F_{Gv}}{F_{Gh}}}{\kappa_{h\_H} + \rho_{h\_H}} * (1 - i_H)$$

and, in the event of positive slip where the second engageable axle is driven, for applying the following mathematical equation for the chassis efficiency:

$$\eta_A = \frac{\kappa_{h\_A} + s\kappa_{v\_A}\frac{F_{Gv}}{F_{Gh}}}{\kappa_{h\_A} + \rho_{h\_A} + e(\kappa_{h\_A} + \rho_{h\_A})\frac{F_{Gv}}{F_{Gh}}} * (1 - i_A)$$

and, in the event of negative slip where only the rear axle is driven, for applying the formula:

$$\eta_H = \frac{\kappa_{h\_H} - s\rho_v\frac{F_{Gv}}{F_{Gh}}}{\kappa_{h\_H} + \rho_{h\_H}} * \frac{1}{1 + i_H}$$

and, in the event when the second engageable axle is driven, for applying the formula:

$$\eta_A = \frac{\kappa_{h\_A} + s\kappa_{v\_A}\frac{F_{Gv}}{F_{Gh}}}{\kappa_{h\_A} + \rho_{h\_A} + e(\kappa_{h\_A} + \rho_{h\_A})\frac{F_{Gv}}{F_{Gh}}} * \frac{1}{1 + i_A}$$

where the variables are defined as:

$\eta_H$ the chassis efficiency for rear-wheel drive;

$\eta_A$ the chassis efficiency for all-wheel drive;

$\kappa_{h\_H}$ the coefficient of driving force for rear-wheel drive;

$\kappa_{h\_A}$ the coefficient of driving force for the rear axle for all-wheel drive;

$\kappa_{v\_A}$ the coefficient of driving force for the front axle for all-wheel drive;

s a ratio of average path speeds of the front wheels and the rear wheels;

$\rho_v$ the coefficient of rolling friction for the front axle for rear-wheel drive;

$\rho_{h\_H}$ the coefficient of rolling friction for the rear axle for rear-wheel drive;

$\rho_{h\_A}$ the coefficient of rolling friction for the rear axle for all-wheel drive;

$F_{Gv}$ a front axle portion of a weight of a vehicle;

$F_{Gh}$ a rear axle portion of the weight of the vehicle;

$i_H$ an average slip of the rear wheels of the vehicle for rear-wheel drive;

$i_A$ an average slip of the rear wheels of the vehicle for all-wheel drive;

e a ratio of the average driving speeds of the front wheels and rear wheels, in which the ratio of the average path speeds of the front wheels and the rear wheels is determined by the equation $$s = \frac{1}{\cos\langle\delta v\rangle}$$

with $(\delta_v)$ average steering angle of the wheels of the front axle, wherein the average slip $i_H$ of the rear wheels is entered into the formula for chassis efficiency $\eta_H$, in all-wheel drive, the average slip $i_A$ of the rear wheels of the vehicle is measured and entered in the formula for the chassis efficiency $\eta_A$ in all-wheel drive is calculated based upon the condition where drive traction in the driven axle is equal to the drive traction of the additionally engaged driving axle by a corresponding mathematical equation $$\kappa_{h\_A} + \kappa_{v\_A}\frac{F_{Gv}}{F_{Gh}} = \kappa_{h\_H} - s\rho_v\frac{F_{Gv}}{F_{Gh}}$$

and the quotient $$\frac{\eta_A}{\eta_H}$$

is used as the engagement criterion for all-wheel drive, and $$i_H \geq 0 \quad \frac{\eta_A}{\eta_H} \geq 1 \quad \text{applies}$$

and to $$i_H \leq 0 \quad \frac{\eta_A}{\eta_H} < 1 \quad \text{applies.}$$

3. The drive control according to claim 1, further comprising, after engagement of the engageable axle for a desired time period and disengagement of the engageable axle from a drive train, means for testing again whether the engagement criterion is fulfilled.

4. The drive control according to claim 1, further comprising means for testing the engagement criterion when the steering angle changes by a minimum defined amount.

5. The drive control according to claim 1, further comprising means for shifting an average axle driving speed to different reciprocal ratios upon driving several driven axles and during all-wheel drive operation.

6. The drive control according to claim 1, further comprising means for determining a ratio of an average wheel peripheral dimension of the respective axles via calibrations whereby only the driven axle is driven during forward motion without actuation of the brakes; and for determining reciprocal ratios of the average speeds for individual axles and in a ratio is constant for a certain time period within a desired tolerance precision, the slip of the wheels is assumed to be zero and under this assumption the ratio of the average wheel peripheral dimensions is determined from the reciprocal ratios of the average speeds of the axles.

7. The drive control according to claim 1, further comprising means for determining a ratio of an average peripheral wheel dimension for the axles via calibrations and only the driven axle is driven and the drive control indicates a time interval in which, during forward motion without actuation of the brakes, the slip of the wheels can be assumed to be zero and in the time interval the ratio of the average wheel peripheral dimensions is determined from the reciprocal ratios of the average speeds of the axles.

8. The drive control according to claim 1, further comprising means for determining an average steering angle of a steering axle by a comparison between a first steering angle measured by the steering angle sensors and a second steering angle determined by the wheel speed ratio.

9. The drive control according to claim 8, further comprising means for determining the average steering angle via a non driven steering axle.

10. The drive control according to claim 1, further comprising means for preventing the engageable driving axle from engaging unless the engagement criterion is present for a predefined time interval.

11. The drive control according to claim 1, further comprising means for engaging the engageable driving axle when the service brake is actuated.

12. The drive control according to claim 1, further comprising means for disengaging the engageable driving axle when a steering brake is actuated.

13. The drive control according to claim 1, further comprising means for engaging the driven axle only when a speed value of a vehicle is below approximately 15 km/h, and means for increasing the speed value to approximately 17 km/h during acceleration of the vehicle and decreasing the speed value to approximately 13 km/h upon deceleration of the vehicle.

14. A method of controlling a drive control for a power train of a motor vehicle having a constantly driven axle and an engageable axle, the drive control comprising an electronic control unit for receiving data from first and second speed sensors positioned on a steerable axle for determining a peripheral speed of a pair of wheels supported by the steerable axle and a third speed sensor positioned on the driven axle for measuring a peripheral speed of a pair of wheels supported by the driven axle, wherein the electronic control unit determines engagement and disengagement of the engageable axle, and the method comprises the steps of:

obtaining from the first, the second and the third speed sensors initial data comprising an actual peripheral speed of the wheels of both the driven axle and the engageable axle;

determining a steering angle from one of a peripheral wheel speed ratio of each of the wheels of the steered axle and a steering angle sensor;

calculating from the steering angle a theoretical ratio of a relative peripheral speed of the wheels without slip for the driven axle and the engageable axle;

comparing the actual peripheral speed of the wheels of the driven axle and the engageable axle obtained from the first, the second and the third speed sensors with the theoretical ratio of the peripheral wheel speeds to determine slip of the driven axle;

generating, in the electronic control unit, initial characteristic lines from the determined slip to obtain a coefficient of driving force and a coefficient of rolling friction;

calculating a theoretical chassis efficiency of the driven axle via a first mathematical equation corresponding to a physical model using the coefficient of driving force, the coefficient of rolling friction, the steering angle, the slip and one of a preset axle load distribution and a measured axle load distribution;

obtaining further data via the first sensor, the second sensor and the third sensor from the driven axle and the engageable axle;

generating further characteristic lines to determine an actual slip value and an actual coefficient of driving force and an actual coefficient of rolling friction based upon a condition where a drive traction of the driven axle is equal to a drive traction of at least one additional driving axle;

calculating an actual chassis efficiency via a second mathematical equation and the further characteristic lines;

obtaining a ratio of the calculated chassis efficiency and the theoretical chassis efficiency, to be used by the electronic control unit as engagement criterion for determining engagement of the engageable axle; and engaging the engageable axle when the engagement criterion is greater than 1 and in the event of positive slip, and, disengaging the engageable axle when the engagement criterion is less than 1 in the event of negative slip.

15. The method according to claim 14, wherein a rear axle is driven axle and a front axle is the engageable axle and, in the event of positive slip where only the rear axle is driven, further comprising the steps of applying the following mathematical equation for chassis efficiency:

$$\eta_H = \frac{\kappa_{h\_H} - s\rho_v \frac{F_{Gv}}{F_{Gh}}}{\kappa_{h\_H} + \rho_{h\_H}} * (1 - i_H)$$

and, in the event of positive slip where the second engageable axle is driven, applying the following mathematical equation for the chassis efficiency:

$$\eta_A = \frac{\kappa_{h\_A} + s\kappa_{v\_A} \frac{F_{Gv}}{F_{Gh}}}{\kappa_{h\_A} + \rho_{h\_A} + e(\kappa_{h\_A} + \rho_{h\_A})\frac{F_{Gv}}{F_{Gh}}} * (1 - i_A)$$

and, in the event of negative slip where only the rear axle is driven, applying the formula:

$$\eta_H = \frac{\kappa_{h\_H} - s\rho_v \frac{F_{Gv}}{F_{Gh}}}{\kappa_{h\_H} + \rho_{h\_H}} * \frac{1}{1 + i_H}$$

and, in the event when the second engageable axle is driven, applying the formula:

$$\eta_A = \frac{\kappa_{h\_A} + s\kappa_{v\_A} \frac{F_{Gv}}{F_{Gh}}}{\kappa_{h\_A} + \rho_{h\_A} + e(\kappa_{h\_A} + \rho_{h\_A})\frac{F_{Gv}}{F_{Gh}}} * \frac{1}{1 + i_A}$$

where the variables are defined as:
- $\eta_H$ the chassis efficiency for rear-wheel drive;
- $\eta_A$ the chassis efficiency for all-wheel drive;
- $\kappa_{h\_H}$ the coefficient of driving force for rear-wheel drive;
- $\kappa_{h\_A}$ the coefficient of driving force for the rear axle for all-wheel drive;
- $\kappa_{v\_A}$ the coefficient of driving force for the front axle for all-wheel drive;
- s a ratio of average path speeds of the front wheels and the rear wheels;
- $\rho_v$ the coefficient of rolling friction for the front axle for rear-wheel drive;
- $\rho_{h\_H}$ the coefficient of rolling friction for the rear axle for rear-wheel drive;
- $\rho_{h\_A}$ the coefficient of rolling friction for the rear axle for all-wheel drive;
- $F_{Gv}$ a front axle portion of a weight of a vehicle;
- $F_{Gh}$ a rear axle portion of the weight of the vehicle;
- $i_H$ an average slip of the rear wheels of the vehicle for rear-wheel drive;
- $i_A$ an average slip of the rear wheels of the vehicle for all-wheel drive;
- e a ratio of the average driving speeds of the front wheels and rear wheels, in which the ratio of the average path speeds of the front wheels and the rear wheels is determined by the equation:

$$s = \frac{1}{\cos\langle\delta_v\rangle}$$

with ($\delta_v$) average steering angle of the wheels of the front axle, wherein the average slip $i_H$ of the rear wheels is entered into the formula for chassis efficiency $\eta_H$ in all-wheel drive, the average slip $i_A$ of the rear wheels of the vehicle is measured and entered in the formula for the chassis efficiency $\eta_A$ in all-wheel drive is calculated based upon the condition where drive traction in the driven axle is equal to the drive traction of the additionally engaged driving axle by a corresponding mathematical equation $$\kappa_{h\_A} + \kappa_{v\_A}\frac{F_{Gv}}{F_{Gh}} = \kappa_{h\_H} - s\rho_v \frac{F_{Gv}}{F_{Gh}}$$

and the quotient $$\frac{\eta_A}{\eta_H}$$

is used as the engagement criterion for all-wheel drive, and applying $$\frac{\eta_A}{\eta_H} \geq 1.$$

16. The method according to claim 14, further comprising the step of, after engagement of the second engageable axle for a desired time period and disengagement of the engageable axle from a drive train, testing again whether the engagement criterion is fulfilled.

17. The method according to claim 14, further comprising the step of testing the engagement criterion when the steering angle changes by a minimum defined amount.

18. The method according to claim 14, further comprising the step of shifting an average axle driving speed to different reciprocal ratios upon driving several driven axles and during all-wheel drive operation.

19. The method according to claim 14, further comprising the step of determining a ratio of an average wheel peripheral dimension of the respective axles via calibrations whereby only the driven axle is driven during forward motion without actuation of the brakes; and for determining reciprocal ratios of the average speeds for individual axles and in a ratio is constant for a certain time period within a desired tolerance precision, the slip of the wheels is assumed to be zero and under this assumption the ratio of the average wheel peripheral dimensions is determined from the reciprocal ratios of the average speeds of the axles.

20. The method according to claim 14, further comprising the step of determining a ratio of an average peripheral wheel dimension for the axles via calibrations and only the driven axle is driven and the drive control indicates a time interval in which, during forward motion without actuation of the brakes, the slip of the wheels can be assumed to be zero and in the time interval the ratio of the average wheel peripheral dimensions is determined from the reciprocal ratios of the average speeds of the axles.

21. The method according to claim 14, further comprising the step of determining an average steering angle of a steering axle by a comparison between a first steering angle measured by the steering angle sensors and a second steering angle determined by the wheel speed ratio.

22. The method according to claim 21, further comprising the step of determining the average steering angle via a non driven steering axle.

23. The method according to claim 14, further comprising the step of preventing the engageable driving axle from engaging unless the engagement criterion is present for a predefined time interval.

24. The method according to claim 14, further comprising the step of engaging the engageable driving axle when the service brake is actuated.

25. The method according to claim 14, further comprising the step of disengaging the engageable driving axle when a steering brake is actuated.

26. The method according to claim 14, further comprising the steps of engaging the driven axle only when a speed value of a vehicle is below approximately 15 km/h, and increasing the speed value to approximately 17 km/h during acceleration of the vehicle and decreasing the speed value to approximately 13 km/h upon deceleration of the vehicle.

* * * * *